(12) United States Patent
Bachmann et al.

(10) Patent No.: US 6,369,943 B1
(45) Date of Patent: Apr. 9, 2002

(54) PROJECTION SCREEN

(75) Inventors: Wolfgang Bachmann, Grevenbroich; Gerhard Krump, Schwarzach; Hans-Jürgen Regl, Regensberg, all of (DE)

(73) Assignee: Harman Audio Electronic Systems GmbH, Straubing (DE)

(*) Notice: Subject to any disclaimer, the term of this patent is extended or adjusted under 35 U.S.C. 154(b) by 0 days.

(21) Appl. No.: 09/700,138

(22) PCT Filed: May 14, 1999

(86) PCT No.: PCT/EP99/03310

§ 371 Date: Dec. 22, 2000

§ 102(e) Date: Dec. 22, 2000

(87) PCT Pub. No.: WO99/60444

PCT Pub. Date: Nov. 25, 1999

(30) Foreign Application Priority Data

May 15, 1998 (DE) .......................................... 198 21 624

(51) Int. Cl.[7] .............................................. G03B 21/56
(52) U.S. Cl. ........................ 359/445; 359/444; 359/451
(58) Field of Search ................................. 359/445, 443, 359/444, 451

(56) References Cited

U.S. PATENT DOCUMENTS

| 5,007,707 A | * | 4/1991 | Bertagni ...................... 350/118 |
| 5,025,474 A | | 6/1991 | Tanaka et al. ............... 381/333 |
| 6,128,130 A | * | 10/2000 | Zobel, Jr. et al. ........... 359/443 |

FOREIGN PATENT DOCUMENTS

| EP | 0 323 110 B1 | 7/1989 |
| EP | 0 323 110 A2 | 7/1989 |
| GB | 353 4 39 | 7/1931 |
| JP | 2-76 400 A | 3/1990 |
| WO | WO 97 09 853 A1 | 3/1997 |

* cited by examiner

Primary Examiner—Russell Adams
Assistant Examiner—Madga Cruz
(74) Attorney, Agent, or Firm—Foley, Hoag & Eliot LLP

(57) ABSTRACT

A projection screen, having a projection surface formed of at least two segments, of which at least two segments are sound radiating segments capable of radiating sound waves from the projection surface and designed to reproduce different frequency ranges.

6 Claims, 4 Drawing Sheets

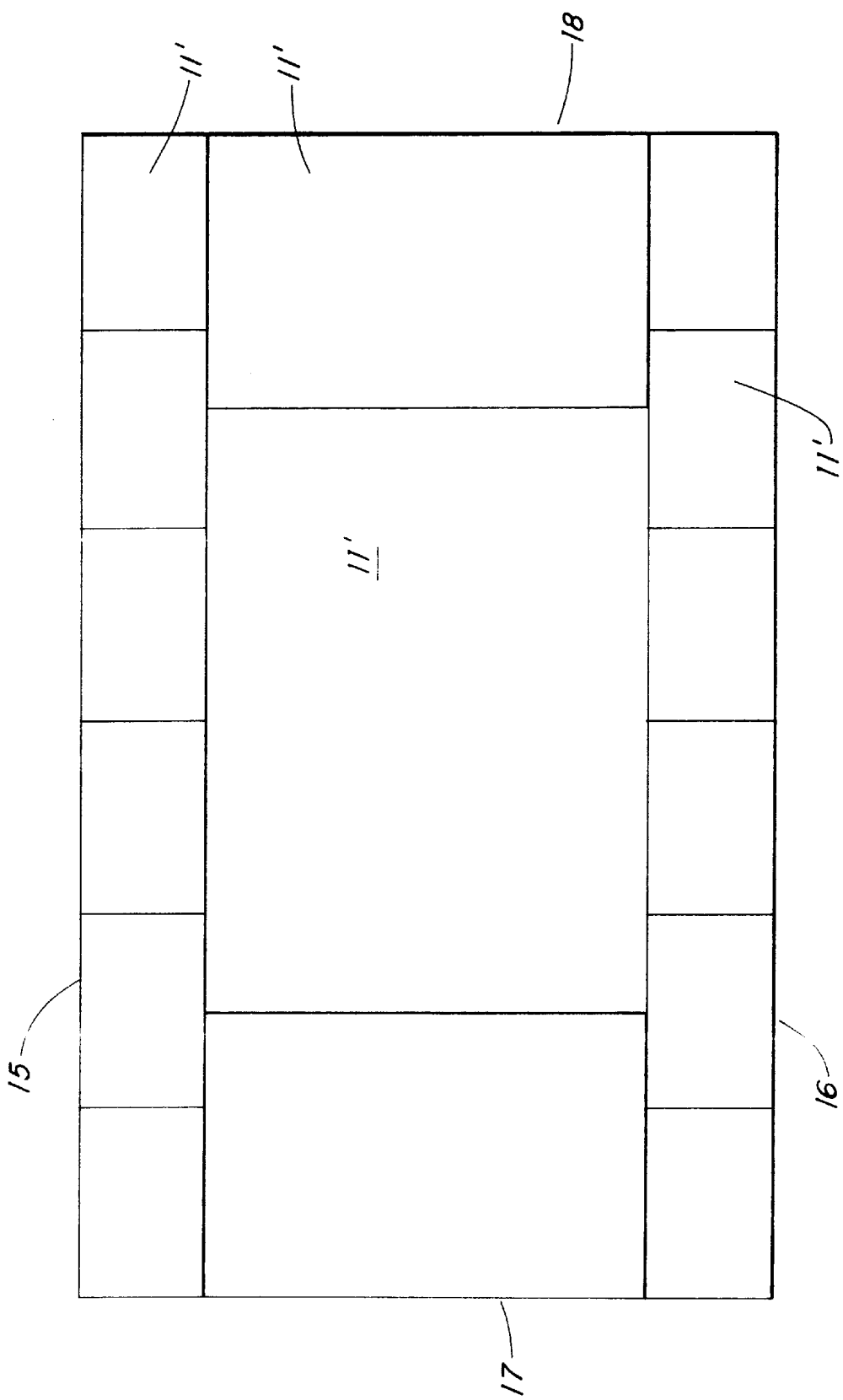

PROJECTION SCREEN

FIELD OF THE INVENTION

The invention relates to the design of projection screens, in particular of projection screens of a type that allow simultaneous reproduction of sound.

BACKGROUND OF THE INVENTION

Presently, essentially two different types of projection screens exist: rear projection screens and front projection screens. With rear projection screens, the image is produced on the side of the projection screen facing away from the spectator. This projection method is known, for example, from television picture tubes.

With front projection screens, the image is produced on the side of the projection screen facing the spectator, whereby the images to be reproduced are projected on to the projection plane from a projector placed at a distance from the projection screen. This method, which also forms the subject matter of the present invention, is known, for example, from movie theaters and slide projection. The latter (front) projection screens have a relatively large size as compared to the rear projection screens described first. Movie theaters, for example, typically employ projection screens having a projection screen diagonal in excess of 15 meters.

If sound effects are to be reproduced in addition to the visual effects, then both projection methods rely on conventional loudspeaker technology, wherein respective loudspeakers or loudspeaker boxes are arranged along the periphery of the respective projection screen. This device is necessary in order to convey to a spectator the impression that the respective sound events originate from the events displayed on the projection screen or are at least related to these events.

To provide an adequate audio level for the room in front of large format projection screens, a large number of conventional loudspeakers of suitable signs should be provided. However, such sound-producing devices can achieve excellent sound reproduction with setups having relatively small projection walls only if the space and/or area used for sound reproduction is disproportionately large relative to the size of the projection screen and/or the size of the image. This is less of an issue with relatively large projection screens. However, with projection screens having a large image diagonal, the audio effects can be noticeably misaligned relative to the visual effects, when the sound reproducing device is placed along the sides of the projection screen. Conversely, while placing the sound reproducing system behind the projection screen improves the mutual correlation between visual and audio effects for large projection screens, the projection screen can disadvantageously interfere with the reproduction of the high frequencies.

For example, U.S. Pat. No. 5,025,474A discloses a projection screen consisting of several segments of which at least some segments operate as sound radiating elements for radiating sound waves from the projection plane of the projection screen. Similar projection screens are described also in U.S. Pat. No. 1,817,630 A, GB 353 439 A, EP 0 323 110 A and U.S. Pat. No. 5,007,707 A. However, these arrangements still do not adequately reproduce high frequencies.

It is therefore an object of the invention to provide a projection screen which eliminates the disadvantages in the sound reproduction associated with the aforementioned conventional devices.

A very compact and space-saving device for simultaneous transmission of visual and audio effects includes a projection wall with at least one segment that radiates sound waves out of the projection plane of the projection screen. With this device, the required area and/or space is no greater than the size of the respective projection screen; in addition, the visual and audio events are once more combined in a single plane and completely and correctly associated with each other.

This is achieved by designing the sound reproduction segments of a projection screen with a different depth perpendicular to the projection plane in order to optimize the reproduction of certain frequency ranges.

The tonal response is optimized by using the entire area for sound reproduction. The higher frequencies are also no longer attenuated by the screen located in front of the loudspeakers.

If, the respective edges of the segments of the projection wall can be mutually decoupled by connecting elements, so that optimally formed sound reproduction segments for reproducing certain frequency ranges can be integrated in the same projection screen and, in addition, regions or zones can be created for transmitting, for example, the different channel information in stereo.

A particularly simple decoupled connection between the segments can be obtained if the segments are made of a core layer and at least one cover layer. The segments of the cover layer(s) and the core layer can then be connected in a simple manner by having the respective cover layer and/or the core layer also bridge the radial gaps between adjacent segments. In particular, by using the core layer to connect several segments, relatively large sections of the core layer can advantageously be manufactured as a continuous uniform piece before the segments produced from this piece are decoupled through cutouts or milled-out portions in the core layer.

The segments and/or sound radiating segments integrated in a projection screen do not necessarily require an area of uniform size in the projection plane of the projection screen. Instead, these areas can be designed and associated with each other to provide flexibility in the sound reproduction of the projection screen.

The bass reproduction can be significantly improved by arranging the segments that are optimized for reproducing low frequencies primarily in the central region of the projection screen, because those segments and/or portions of the projection screen that laterally abut the segments provided for the bass transmission, can be used to reduce dipole shunting.

The sound reproduction can be further optimized by optimizing the sound production segments of a projection screen that are designed to reproduce certain frequency ranges, by giving them a different depth perpendicular to the projection plane.

The projection surface of the projection screen need not be planar, but can also be curved. This device modifies the radiated sound pattern, thereby further optimizing the sound generation for the room. The—not necessarily uniform—curvature of the projection surface selectively addresses, for example, certain areas in the auditorium and hence can further improve the audio perception.

BRIEF DESCRIPTION OF THE DRAWINGS

FIG. 2 shows a top view of a projection screen;

DETAILED DESCRIPTION OF CERTAIN ILLUSTRATED EMBODIMENT

The invention will now be described in detail with reference to the Figures.

Figure 1:
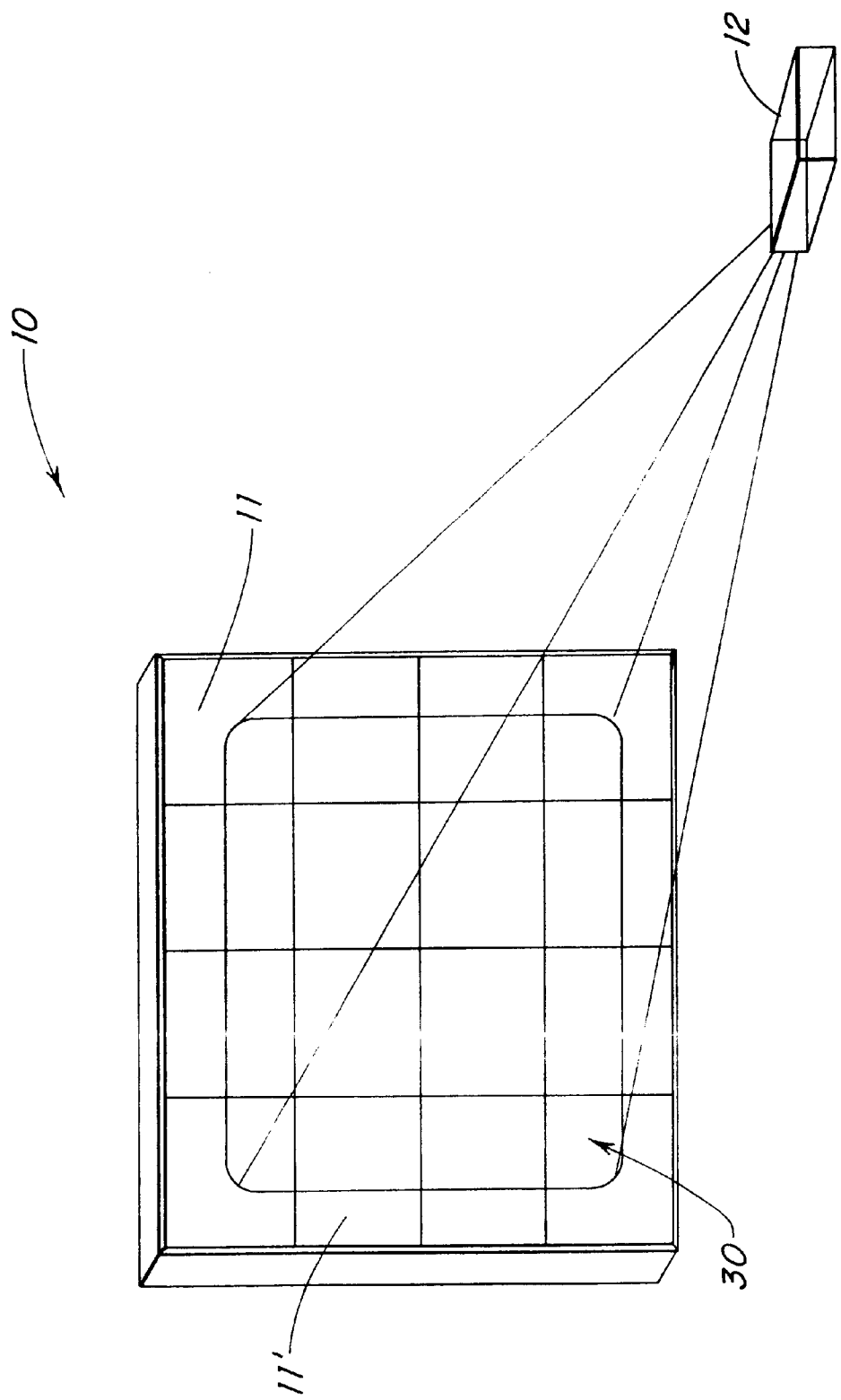
FIG. 1 shows a perspective view of a projection screen.

FIG. 1 shows a projection wall 10 formed of a plurality of segments 11. A projector 12 that projects images onto the projection plane 30 of the projection screen 10 is placed at a distance from the front of the projection screen 10. Depending on the application, the projector 12 can be a slide projector, a film projector, an LCD projector or a laser projector.

Each of the segments 11 depicted in FIG. 1 is formed as a sound radiating segment 11'. As described above with reference to DE-A-19757097.6, to which reference is made in the present application, each sound radiating segment 11' is formed of a light core layer 13 (FIG. 3a) and at least one cover layer 14 (FIG. 3a), wherein the respective cover layers 14 are made of a material having a particularly high dilatational wave velocity and are connected with those surfaces of the core layer 13 having the largest area. For sake of completeness, it should be mentioned that the respective sound radiating segments 11' are provided with, for example, electrodynamic transducers that produce bending waves in response to control signals transmitted to the sound radiating segments 11'. Further details are described in the aforementioned reference.

By constructing the entire projection screen 10 of sound radiating segments 11', the entire projection plane available for reproducing the projected image is simultaneously available also for reproducing sound. As mentioned above, this arrangement not only saves space, but also allows the spectator to associate the audio and visual effects much more strongly as compared to conventional setups. The spectator now has the feeling that the audio events originate from the same location as the associated visual event.

It should be pointed out that the screen 10 depicted in FIG. 1 therein can have a slight curvature (not shown). This—concave—curvature is implemented essentially by placing all regions of the projection screen 10 substantially at the same distance from the point-like image source, i.e., the projector 12. When viewed from the front, the projection plane 30 of the projection screen 10 has then the form of the open shell, which tends to more strongly concentrate the sound waves that are simultaneously radiated from the projection screen 10. Conversely, if the sound waves are to be dispersed by the projection screen 10, then the projection screen 10 can have a convex curvature. The curvature of the projection screen 10 also need not be uniform over the entire area of the projection screen. Instead, the projection screen 10 can have a number of different radii of curvature.

The entire projection screen 10 depicted in FIG. 1 is provided with sound radiating segments 11'. In another embodiment (not shown), segments 11 which are not constructed as sound radiating segments 11' can also be integrated with the projection screen 10. Such (blind) segments 11 can be used to attach and support the projection screens 10 at the respective installation location.

A second embodiment of a projection screen 10 is depicted in FIG. 2. All segments 11 are formed as sound radiating segments 11'; however, unlike the embodiment of FIG. 1, the sound radiating segments 11' of FIG. 2 have areas of different size in the projection plane 30. The largest sound radiating segment 11' is placed in the central portion of the projection screen 10 and optimized for reproducing low frequency audio events. A row consisting of six sound radiating segments 11' which have the respective smallest area in the projection plane and are employed for radiating high frequency audio events are located at the upper and lower edges 15, 16 of the projection screen 10. A sound radiating segment 11' that has an area with a size intermediate between the aforementioned sound radiating segments 11' is located at the lateral edges 17, 18 of the projection screen 10 and used to reproduce audio events in the midrange. For sake of completeness, it shall be mentioned that the sound radiating segment 11' for the bass reproduction need not necessarily be located in the center of the projection screen 10. It is also possible to reproduce low frequency sound by arranging in the center region of the projection screen 10 and/or across the entire projection screen a plurality of not necessarily symmetrically positioned sound radiating segments 11'. However, the (bass) segments 11' should also be surrounded, as previously described, by other segments 11 or 11' to prevent an acoustic short circuit. For the same reasons, the respective (bass) segment 11' should also be connected to at least the adjacent segments 11, 11' with connecting elements 19, 20 that are impervious to sound waves.

The connection between the (blind) segments 11 and/or the sound radiating segments 11' is illustrated in more detail in FIGS. 3a to 3e.

Figure 3A:
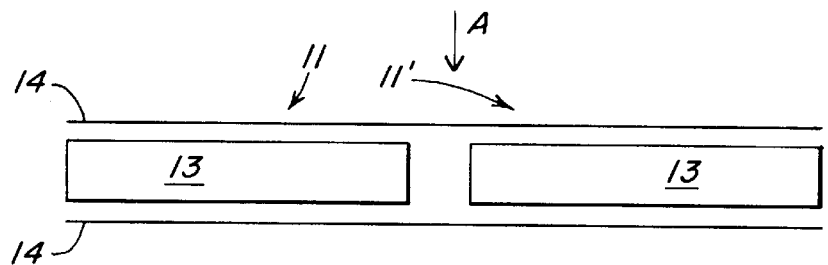
FIGS. 3 a–e show five different connections between segments of a projection screen.

FIG. 3a shows two core layers 13 arranged side-by-side, wherein a gap A exists between the two core layer 13. The two surfaces of the two illustrated core layers 13 that have the largest area, are connected by a respective cover layer 14. Since the upper and lower cover layer 14 for both segments 11 (11') is formed as a common cover layer 14, this cover layers 14 simultaneously also forms a continuous bridge across the gap A, thereby decoupling the two segments 11 (11'). For sake of completeness, it should be pointed out that the actual distance between the two cover layers 14 and the respective surfaces of the core layers 13 is smaller than shown in the drawings.

Figure 3B:
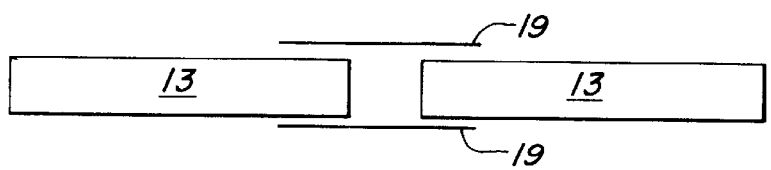

FIG. 3b shows two core layers 13 that are already provided with one or two cover layers 14 (not shown in FIGS. 3b). The gap A between the segments 11 (11') can be bridged while simultaneously acoustically decoupling the segments from one another by gluing two strips 19 to the cover layers 14 of the core layers 13 to cover the gap A.

In another embodiment (not shown), the two strips 19 of FIG. 3b that connect the two segments 11 (11') can also be glued directly on the core layers 13, i.e., before the cover layers 14 are applied. In this case, the two cover layers 14 of both core layers 13 can be continuous—as described above with reference to FIG. 3a—, so that the respective connection between the two segments 11 (11') consists of a strip 19 and a cover layer 14 covering the strip 19.

To give the surface structure in the embodiment depicted in FIG. 3b a uniform appearance, the strips 19 can be inserted into milled-out sections (not shown) in the core layers 13, with the thickness of the milled-out sections being matched to the thickness of the strips 19.

Figure 3C:
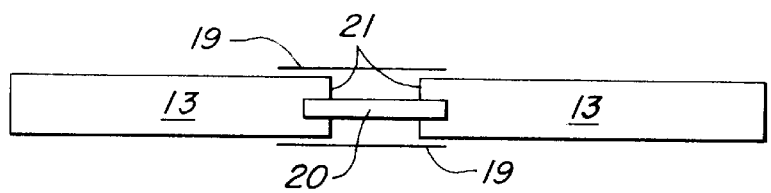

Unlike the embodiment of FIG. 3b, in the embodiment depicted in FIG. 3c the narrow sides 21 of the two core layers 13 are also connected with a connecting element 20. The strips 19 in this case have essentially the purpose of providing a uniform surface characteristics between two segments 11, (11').

Figure 3D:
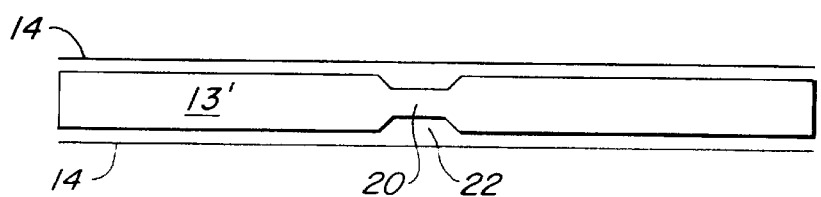

FIG. 3d depicts two segments 11 (11') with a uniform core region 13'. Unlike the core layers 13 depicted in FIGS. 3a–c and 3e that are separated by a gap A, the core layer region 13' of FIG. 3d has two trapezoidal milled-out portions 22 so as to reduce the thickness of the core layer regions 13' and promote a decoupling of the two segments 11 (11'). Accordingly, the remaining portion between the two segments 11 (11') acts as a connecting elements 20 in the same fashion as the connecting element 20 illustrated in FIG. 3c. The two segments 11 (11') can also be covered with cover layers 14 that are uniform for both segments 11 (11') and cover the milled-out portions 22.

Figure 3E:
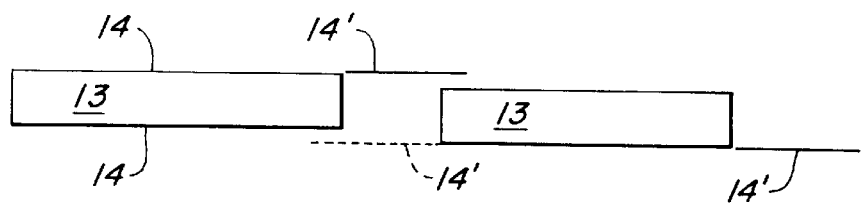

FIG. 3e shows an additional embodiment of a connection between two (blind) segments 11 and/or sound reproduction segments 11'. Both sides of the two core layers 13 are provided with cover foils 14. For connecting the two segments 11 (11') with one another, one of the cover layer 14 has a region 14' that projects over the narrow sides 21 of the core layer 13. These projecting regions 14' of the cover layers 14 can be used—as illustrated in FIG. 3e—to connect two segments 11 (11') by connecting the projecting region 14' of one segment 11 (11') with a cover layer 14 of the other segment 11 (11'). When the segments 11 (11') are formed as shown in FIG. 3e, large quantities of such segments 11 (11') formed of the core layer 13 and the cover layers 14 can easily be pre-produced and connected with one another through the projecting regions 14'.

For connecting two segments 11 (11') located on both sides of the gap A, the respective segments 11 (11') can also be provided with two projecting regions 14'. This situation is indicated in FIG. 3e for the right segment 11 (11') by dotted lines.

With reference to the embodiments depicted in FIGS. 3a to 3e, it should be mentioned that the depicted connections between two segments 11 (11') should be designed so as to be impervious to sound at least if one of the segments 11 (11') attached in this manner is connected to a sound radiating segment 11' used to reproduce low frequency sound. Only a connection that is impervious to sound can reliably prevent acoustic short circuits.

It should also be noted that the connecting elements 19, 20, due to their respective spring mass damping characteristics, operate simultaneously as mechanical filters and can hence be used to intentionally optimize and/or control the sound radiating characteristics.

Figure 4:
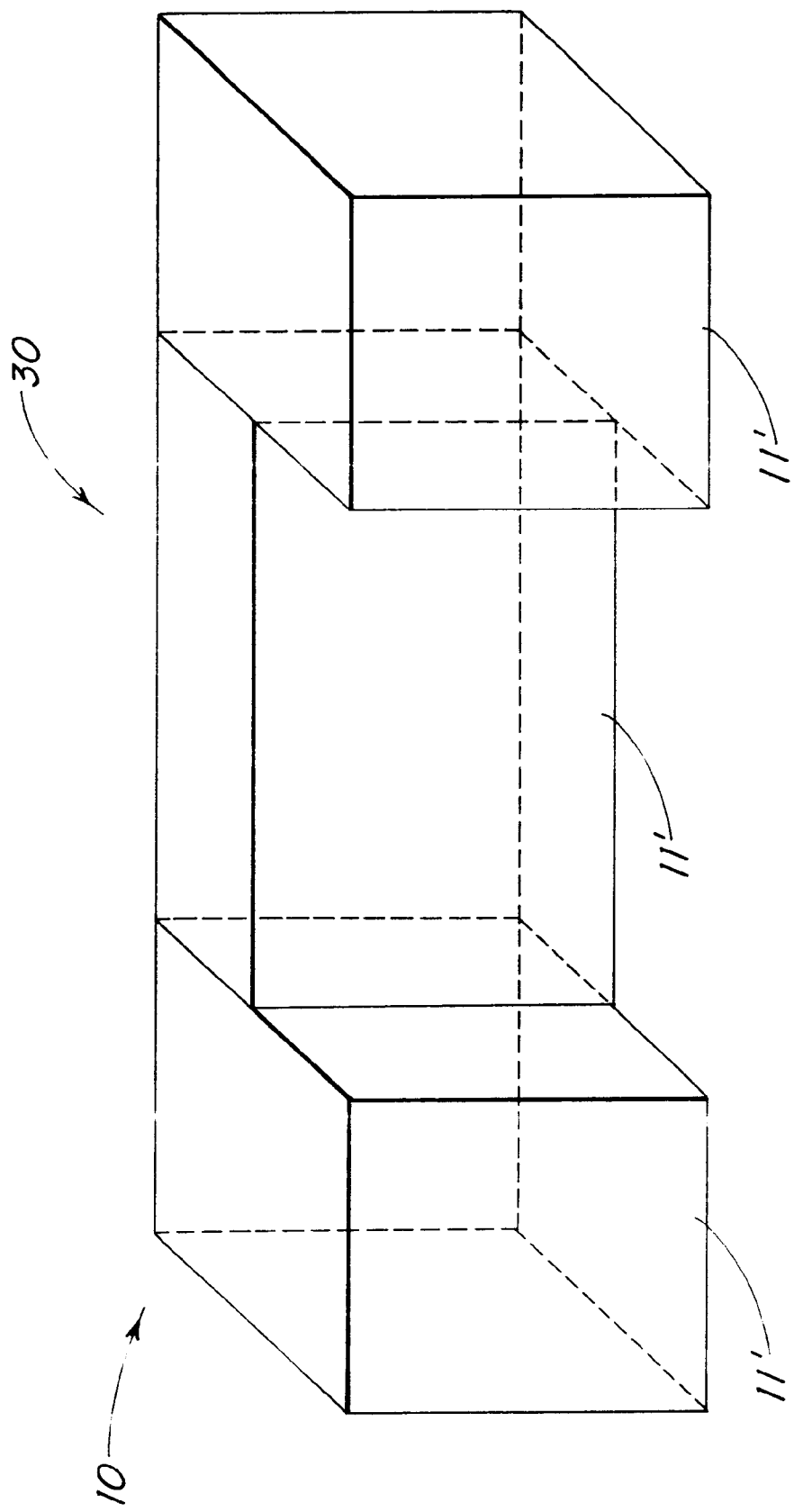
FIG. 4 shows the backside of a projection screen.

FIG. 4 shows a rear view of a projection screen 10 formed of three sound radiating segments 11'. As seen in FIG. 4, the different sound radiating segments 11' can not only have a different area, as described above with reference to FIG. 2, but can also have a different depth perpendicular to the projection plane 30 of the projection screen 10. The different depth of the sound radiating segments 11' is used to optimize the sound reproduction of certain regions of the projection screen 10. If—as shown in FIG. 4—the different sound radiating segments 11' are combined with one another in such a way that the sound radiating segments 11' have a different depth only on the backside of the projection screen 10, then the front surface of the projection screen 10 (not visible in FIG. 4) remains uninterrupted to form a smooth projection plane 30.

We claim:

1. Projection screen comprising
    a projection surface formed of at least two segments, of which
        at least two segments are sound radiating segments capable of radiating sound waves from the projection surface and designed to reproduce different frequency ranges,
    wherein a sound radiating segment that radiates sound waves in a lower frequency range has a smaller depth in a direction perpendicular to the projection surface than another of the sound radiating segments that radiates sound waves in a higher frequency range.

2. Projection screen according to claim 1, further including connecting elements which connect edges of the at least two segments of a projection surface with one another in a decoupled fashion.

3. Projection screen according to claim 2, wherein at least the sound radiating segments are formed of a core layer having two major surfaces and at least one cover layer, wherein at least one cover layer is connected with one of the major surfaces of the core layer positioned in the projection surface, and wherein the respective connecting elements are formed by at least one of the core layer and one of the cover layers.

4. Projection screen according to claim 1 wherein the sound radiating segments are designed for different reproduction applications, and the sound radiating segments having different reproduction applications have different size areas in the projection surface.

5. Projection screen according to claim 4, wherein a sound radiating segment essentially used for reproducing low frequencies is arranged primarily in a center region of the projection surface and surrounded at least partially by the remaining segments.

6. Projection screen according to claim 1, wherein at least the projection surface that faces a projector is curved.

* * * * *